United States Patent [19]
Sato et al.

[11] 3,941,022
[45] Mar. 2, 1976

[54] HORIZONTAL BAND SAWING MACHINE SUITED FOR CUTTING STEEL SECTIONS LIKE H-SHAPED STEEL

[75] Inventors: Masao Sato; Hideji Majima, both of Sagamihara, Japan

[73] Assignee: Amada Company Ltd., Isehara, Japan

[22] Filed: Nov. 13, 1974

[21] Appl. No.: 523,453

[52] U.S. Cl. .................. 83/796; 83/461; 83/466; 83/644; 83/8.1
[51] Int. Cl.² ......................................... B26D 1/46
[58] Field of Search ............ 83/796, 801, 794, 644, 83/809–812

[56] References Cited
UNITED STATES PATENTS

| | | | |
|---|---|---|---|
| 3,752,022 | 8/1973 | Demurger | 83/801 X |
| 3,789,717 | 2/1974 | Stolzer | 83/796 |

*Primary Examiner*—Frank T. Yost
*Attorney, Agent, or Firm*—Wigman & Cohen

[57] ABSTRACT

The present invention is directed to a construction of a horizontal band sawing machine which is particularly suited for the cutting of materials having at least one web portion and a flange portion, such as L-shaped steel sections.

In a horizontal band sawing machine including a housing which is pivotally connected at one end thereof, the construction achieves a structural advantage by involving a plurality of portions where the housing is pivotally connected while a stock vice mechanism is provided to the construction which is capable of holding such a steel material as L-shaped steel not only from the left and right sides thereof, but also from above and below.

2 Claims, 6 Drawing Figures

HORIZONTAL BAND SAWING MACHINE SUITED FOR CUTTING STEEL SECTIONS LIKE H-SHAPED STEEL

BACKGROUND OF THE INVENTION a. Field of the Invention

The present invention relates generally to a horizontal sawing machine which is particularly suited for the cutting of steel such as L-shaped steel sections.

b. Description of the Prior Art

A band sawing machine of horizontal type in conventional use including a housing which has one end thereof pivotally connected involves a drawback from the viewpoint of structure in that, when cutting a steel material having a web portion and a flange portion or flange portions such as L-shaped steel section, the machine has one end of the housing positioned lower than its vice bed at the completion of a cutting stroke. Moreover, pressure exerted by an ordinary stock vice onto the opposing flange portions from both sides tends to cause the web portion to flex vertically, thus preventing the steel material from being cut with accuracy.

DESCRIPTION OF THE INVENTION

The present invention generally relates to a band sawing machine of horizontal type and, more particularly, to a band sawing machine of the type described which is suited particularly to the cutting of various steel sections such as H-shaped steel.

As viewed in FIG. 1, an H-shaped steel section generally designated 1 includes a horizontally extending relatively long web portion 3 and a pair of flange portions 5 extending perpendicularly to the web portion 3 at opposite ends thereof. Where it is intended to cut such an H-shaped steel 1 with use of a band sawing machine, the opposing flange portions 5 and 5 should preferably be cut simultaneously from the viewpoint of efficiency while, as regards the web portion 3, the band saw blade should preferably be held in an angular position relative to the web portion so that resistance to cutting may be prevented from growing to an objectionable extent and to thereby enchance the efficiency.

One type of band sawing machine presently available for exclusive use in the cutting of H-shaped steel sections is designed to have its blade urged downwardly at a given inclination relative to the web portion of a steel section, which is fixedly retained by a stock vice. By virtue of the angular position of the blade, such a type of band sawing machine will substantially satisfy the two different conditions mentioned in the preceding paragraph for the enhancement of cutting efficiency. It is not fully acceptable, however, in view of the fact that the blade remains in the angular position even at the completion of a cutting stroke, that is, one end of the blade housing is lowered beyond the bed surface of the stock vice to consequently require an oil pan be positioned far lower than the vice bed surface to receive a cutting liquid or the like. Drawbacks resulting from the fact described above are that the cutting liquid or oil flows down from a relatively high position and thus scatters out of the oil pan, that a difficulty is experienced in the installation of mechanisms for operating feed rollers and the like which should be operated in the front of the machine, and that the entire size of the machine is enlarged with its center of gravity defined in a higher position. Moreover, where an H-shaped steel is retained by an ordinary stock vice mechanism at its flange portions, the web portion tends to cause flexure in the vertical direction which is perpendicular to the direction of the retaining force exerted by the stock vice.

An object of the present invention is therefore to overcome the drawbacks described above inherent in the prior art arrangement.

Other object, advantages and features of the instant invention will be readily apparent from the following detailed description with reference to the appended claims and drawings, in which:

Figure 1:
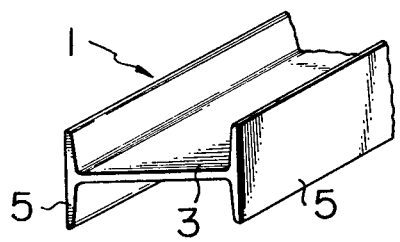
FIG. 1 is a perspective view showing an H-shaped steel section.

Let it now be assumed that the web portion 3 of the H-shaped steel 1 shown in FIG. 1 is intended to be cut and that reference character $a$ denotes a minimum allowable inclination of a band saw blade preventing an excessively large resistance to cutting. In order that the blade may become parallel to the bed surface of a stock vice upon completion of the cutting motion from the angular position $a$, the blade may be caused to rotate about a point A. In this case, however, the blades initial or start position falls into an angular state designated $a$-1 with an undesirably large angle of inclination. Alternatively, the blade may be rotated about a point B from the angular position $a$ with a view to making the inclination in the initial position of a cutting stroke as small as possible. This will provide a more desirable start position designated $b$-1, but at the completion of the cutting stroke will provide an angular position $b$-2 so that the blade is incapable of finishing the cutting motion in parallel relation to the vices bed surface.

Figure 3:
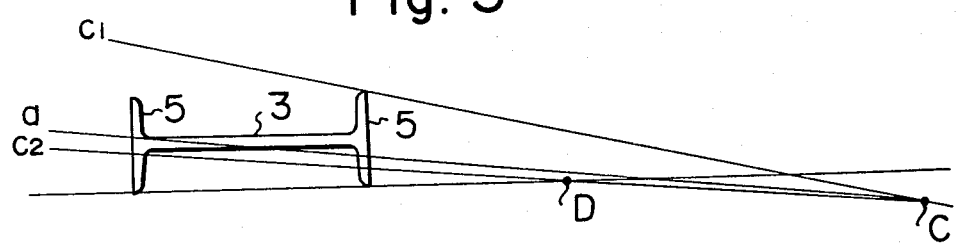

Operational concept of the band sawing machine according to the invention is illustrated in FIG. 3. The minimum allowable inclination of the band saw blade is also designated by reference character $a$ in FIG. 3. The blade's initial position in a cutting stroke is denoted by $c$-1 (with a smaller angle of inclination) which is defined by rotating the blade from the angular position $a$ about a point C (relatively remote from the cutting position). Rotational motion of the blade proceeds about point C from position $c$-1 through position $a$ to a position $c$-2 where the web 3 has been substantially cup up. At this instant, the center of rotation is shifted from point C to a point D so that the blade further rotates about the new center of rotation to complete the cutting stroke in a position parallel to the vice's bed surface.

Figure 4:
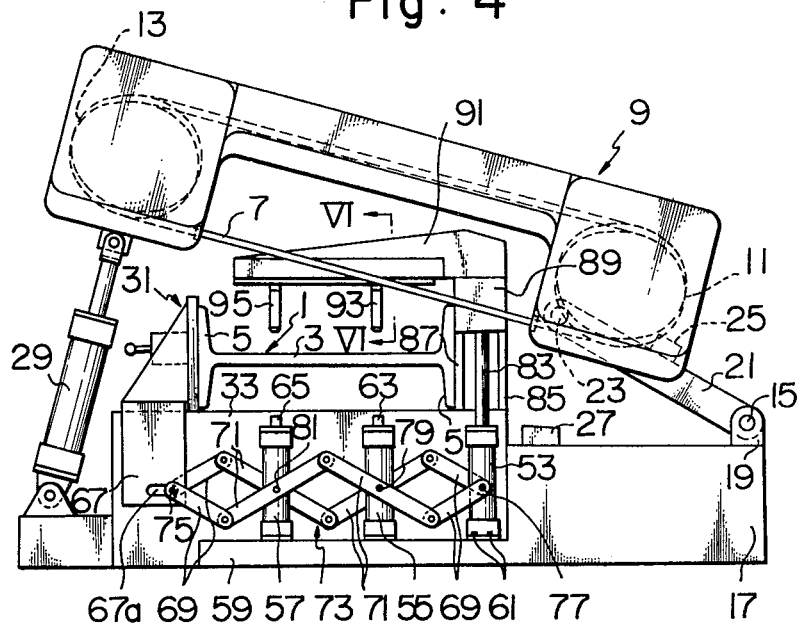
FIG. 4 is a front end view illustrating a preferred embodiment of the band sawing machine according to the present invention.

Referring now to FIG. 4, numeral 7 designates a band saw blade which is passed over a drive wheel 11 and a driven wheel 13 respectively mounted in a housing 9, 15 a hinge pin provided to a support 19 which in turn is provided to a bed 17, 21 a link member pivotally mounted on the hinge pin 15, 23 a hinge pin associating the housing 9 and the link member 21 with each other, 25 a stop disposed to the housing 9 in such a manner as to be engageable with the link member 21, 27 a stop disposed to the bed 17, and 29 a hydraulically operated cylinder extending between the housing 9 and the bed

17.

Figure 5:
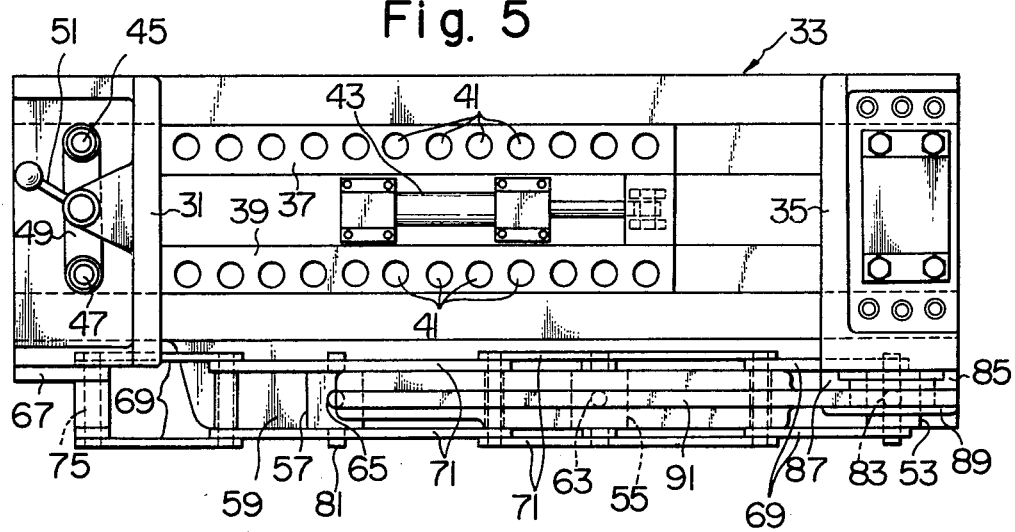
FIG. 5 is an enlarged plan view of a stock vice mechanism.

Numeral 31 designates a movable vice member disposed in spaced face-to-face relation to a stationary vice member 35 (see FIG. 5) which is fixedly carried on a vice bed 33, and numerals 37 and 39 indicate a pair of spaced slidable plates each of which is disposed on the vice bed 33 in parallel to the other and formed with a series of openings 41 at a suitable distance. The plates 37 and 39 are caused to slidingly reciprocate on the vice bed 33 by a hydraulically operated cylinder 43, which is also mounted on the vice bed 33. Numerals 45 and 47 designate a pair of pins integrally associated through a connecting plate 49 while extending through the aforesaid movable vice 31, and lower ends of the pins 45 and 47 are engageable with the opening 41 of the corresponding slidable plates 37 and 39. The pins 45 and 47 have their lower ends brought into and out of resister with selected openings 41 by an actuating level 51. With the actuating level 51, the movable vice member 31 is shifted to a suitable position according to the particular width of a steel section and the pins 45 and 47 are engaged with selected openings 41, whereupon the slidable plates 37 and 39 are urged into sliding movement by hydraulic cylinder 43 toward the stationary vice member 35. Thus, steel sections of various widths can be held between the stationary vice member 35 and the movable vice member 31.

Further disignated by numerals 53, 55 and 57 are hydraulically operated cylinders which are supported on a common shelf portion projecting from the lower front of the vice bed 33. Cylinder 53 is secured to the shelf portion 59 by fixing means 61 whereas cylinders 55 and 57 are slidable transversely on the shelf portion 59. Cylinders 55 and 57 are provided with piston rods 63 and 65, respectively, which are capable of projecting above the upper surface of the vice bed 33.

Figure 6:
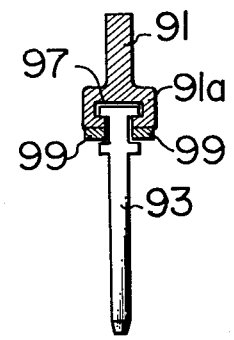
FIG. 6 is an enlarged section taken along line VI—VI of FIG. 4.
Figure 2:
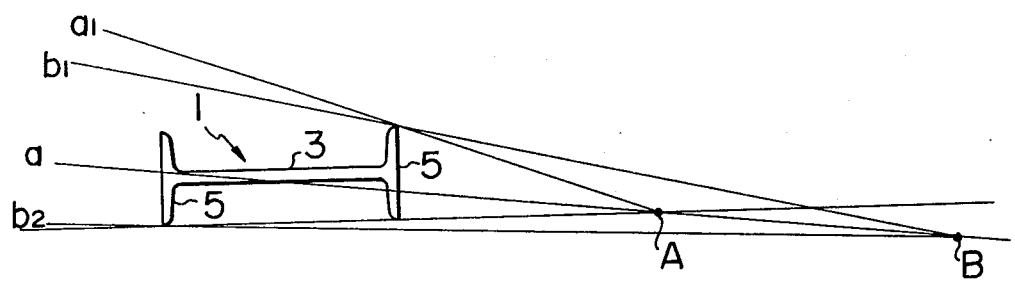
FIGS. 2 and 3 are views illustrative of general concepts of the operation of a band sawing machine.

Fixed through pins 75 and 77 to a bracket 67 mounted on the side periphery of the movable vice 31 and the hydraulic cylinder 53, respectively, are opposite ends of a pantograph mechanism 73 which consists of a plurality of link members 69, 69 . . . and a plurarity of link members 71, 71 . . . pivotally connected with the first link members. Cylinders 55 and 57 are associated with the pantograph mechanism 73 through pins 79 and 81, respectively, at positions trisectioning the pantograph. In the standards of steel sections including H-shaped steel, there are involved those of such a small width that they cannot be properly held between the vice members even with the pantograph mechanism 73 fully contracted. To prepare for such a case, the bracket 67 is formed with an elongate slot 67a, in which the pin 75 is movable, so that the pin 75 can be untightened to render the pantograph mechanism 73 movable and, thereupon, the movable vice 31 is drawn to the right in FIG. 4. Cylinder 53 has the piston rod 83 extended upwardly above the upper surface of the vice bed 33 at the side of stationary vice member 35. To the upper end of piston rod 83 is coupled a body 89 which is guided by a pair of parallel spaced guides 85 and 87 mounted on the side periphery of the stationary vice member 35 so as to be slidable in the vertical direction. An arm 91 extends from the upper portion of the body 89 toward the movable vice member 31 while a pair of web retaining members 93 and 95 extend downwardly from the arm 91. Each of the web retaining members 93 and 95 has its upper portion shaped as shown in FIG. 6 and received in an elongate recess 97 formed with a T-shaped cross section in the lower portion of an enlarged portion 91a provided to the arm 91, thus being slidable longitudinally of the arm 91 in the recess 97 when moved manually. Suitable members 99 made of such a resilient material as hard rubber for instance are attached to the lower periphery of the enlarged portion 91a, whereby the pair of web retaining members 93 and 95 is allowed to ridigly downwardly hold the web portion 3 of the workpiece 1 despite an appreciable difference in height, if any.

Cylinders 55, 57 and 53 and movable vice member 31 may be operated by a fluid under pressure flowing through a common circuit, but the piping is designed to give the cylinders 55 and 57 and the cylinder 53 opposite directions of operation.

In use, pins 45 and 47 extending through movable vice 31 of the band sawing machine are first brought into register with openings 41 of selected positions according to the particular width of the H-shaped steel. The hydraulic cylinder 43 is then actuated to urge the movable vice 31 toward the stationary vice member 35 through slide plates 37 and 39 having formed the openings 41, thereby holding the steel section between the stationary and movable vice members at its flange positions.

In the meantime, the pantograph mechanism 73 having its one end associated through pin 75 with the bracket 67 integral with the movable vice 31 is contracted in conformity with the spacing between the movable member 31 and the stationary member 35, viz., the width of the workpiece. Connected with the pantograph mechanism 73, cylinders 55 and 57 are automatically moved to positions dividing the spacing mentioned above or the web portion 3 into three equal parts.

As the cylinders 53, 55 and 57 are hydraulically actuated, cylinder 53 has the piston rod 83 urged downwardly whereas piston rods 63 and 65 cylinders 55 and 57 are urged upwardly. The downwardly movement of the piston rod 83 causes the arm 91 to move downwardly through guide body 89 with the result that web retaining members 93 and 95, which have been preadjusted to positions trisecting the web portion of the intended steel section, presses downwardly the corresponding positions of the web portion 3. Thereafter, piston rods 63 and 65 of cylinders 55 and 57 press upwardly the positions on the web portion 3 trisecting the same, thus cooperating with the piston rod 83 to positively hold the web portion therebetween.

It should be noted that, although the cylinders 55 and 57 pressing the web portion 3 upwardly and the web retaining members 93 and 95 pressing the same downwardly have been shown and described as being provided in pairs respectively, the cylinders and the retaining members may respectively be provided more than two or one, if necessary.

Where the workpiece is retained in this manner and the housing 9 for cutting blade assumes the highest position with the piston rod (not numbered) of hydraulic cylinder 29 held in the fully projected state, the link member 21 remains in abutting engagement with the stop 25 fixedly mounted on housing 9. As the cylinder 29 has its piston rod progressively retracted from this position, the housing is moved pivotally downwardly about hinge pin 15 with the link 21 kept in engagement with the stop 25. Then, upon engagement of the link 21 with another stop 27, the housing 9 further pivotally moves but about another hinge pin 23. It will thus be seen that the blade housing 9 is provided with two different hinge portions, viz., one 15 remote from the cutting position (corresponding to the center of rotation C indicated in FIG. 3) and the other 23 close to the cutting position (corresponding to the center of rotation D), such that it is caused to rotate about hinge portion 15 in the initial stage of its downward cutting stroke and then about the other hinge portion 23 to the completion of the downward stroke.

What is claimed is:

1. A band sawing machine of the horizontal type comprising a blade housing (9) pivotally connected to a bed (17) by means of a link member (21), means (29) for downwardly moving said blade housing (9) relative to said bed (17) in a cutting stroke through a cutting station (31), said link member (21) being pivotally connected at one end thereof to said bed (17) by means of a first hinge portion (15) disposed remote from said cutting station (31), said link member (21) being pivotally connected at the other end thereof to said blade housing (9) by means of a second hinge portion (23) disposed relatively closer to said cutting station (31) than said first hinge portion (15), first stop means (25) carried by said blade housing (9) and adapted to engage said link member (21) to limit relative rotation between said link member (21) and said blade housing (9) in one direction about said hinge portion (23), and second stop means (27) carried by said bed (17) and adapted to engage said link member (21) to limit relative rotation between said link member (21) and said bed (17) in one direction about said hinge portion (15) during downward movement of said blade housing (9) in a cutting stroke, whereby said blade housing (9) will rotate about said first hinge portion (15) during the initial stages of a cutting stroke while said link member (21) remains in engagement with said first stop means (25) thereby preventing relative rotation between said link member (21) and said blade housing (9), and said blade housing (9) will then rotate about said second hinge portion (23) during the completion stage of a cutting stroke as said link member (21) comes into engagement with said second stop means (27) thereby preventing relative rotation between said link member (21) and said bed (17).

2. A band sawing machine as defined in claim 1 particularly suited for the cutting of H-shaped steel sections, further comprising a stock vice mechanism including a movable vice member (31) slidable in a first direction and a stationary vice member (35), at least one upwardly directed web retaining means disposed below the upper surface of a vice bed (33) so as to be slidable in the same direction as said movable vice member (31), a pantograph mechanism (73) having one end pivotally connected to said movable vice member (31) and its other end suitably fixed on said stationary vice member (35), said upwardly directed retaining means being connected to at least one suitable position of said pantograph mechanism (73), an arm (91) vertically movable and disposed above the upper surface of said bed (33), and at least one downwardly directed web retaining means connected to said arm (91) in such a manner as to be free to slidingly move or remain stationary in the direction in which said movable vice member (31) is slidable.

\* \* \* \* \*